United States Patent [19]
Keith

[11] Patent Number: 6,103,333
[45] Date of Patent: Aug. 15, 2000

[54] WOOD VENEER LAMINATED CHAIR MAT

[76] Inventor: George A. Keith, 1191 Foxboro La., Bartlett, Ill. 60103

[21] Appl. No.: 09/084,022

[22] Filed: May 22, 1998

[51] Int. Cl.$^7$ ................................................ B32B 21/08
[52] U.S. Cl. ........................... 428/99; 144/332; 144/344; 428/66.2; 428/100; 428/213; 428/220; 428/537.1; 428/537.5
[58] Field of Search .................. 428/99, 100, 66.2, 428/213, 220, 537.5, 537.1, 424.6; 144/332, 344

[56] References Cited

U.S. PATENT DOCUMENTS

| | | | |
|---|---|---|---|
| 1,776,790 | 9/1930 | Harvey | 428/537.1 |
| 2,831,793 | 4/1958 | Elmendorf | 428/105 |
| 3,287,203 | 11/1966 | Elmendorf | 428/105 |
| 3,952,131 | 4/1976 | Sideman | 428/334 |
| 4,733,997 | 3/1988 | Ford et al. | 409/84 |
| 4,818,590 | 4/1989 | Prince | 428/213 |
| 4,865,093 | 9/1989 | Ford et al. | 144/144 R |
| 5,169,699 | 12/1992 | Prince | 428/68 |
| 5,352,510 | 10/1994 | Laughlin | 428/304.4 |
| 5,372,892 | 12/1994 | Keith | 428/537.1 |
| 5,470,631 | 11/1995 | Lindquist et al. | 428/105 |

FOREIGN PATENT DOCUMENTS 4135658  5/1993  Germany .

*Primary Examiner*—Nasser Ahmad
*Attorney, Agent, or Firm*—Larry L. Saret; Laff Whitesel & Saret, Ltd.

[57] ABSTRACT

A durable chair mat has a resin impregnated backing sheet base layer, a polyvinylchloride middle layer and a wood veneer top layer laminated together.

9 Claims, 2 Drawing Sheets

WOOD VENEER LAMINATED CHAIR MAT

BACKGROUND OF THE INVENTION

Office chairs are often provided with casters to allow the user to roll the chair while seated. To lower rolling resistance and to protect the floor from wear, it is common to use a chair mat. A conventional chair mat is typically constructed of a clear or translucent sheet vinyl material (pliable or rigid) having a relatively smooth upper surface and a bottom surface optionally provided with a plurality of integrally molded spikes for engaging a carpeted floor. One of the drawbacks of such conventional vinyl chair mats is that the vinyl tends to crack over time, losing its integrity. Besides being aesthetically unpleasing, conventional chair mats commonly become fragmented along the cracks so that pieces of the mat can become detached, exposing the flooring below. Chair mats comprising a carpet layer on the appearance side are also known. Such carpeted chair mats, however, do not allow the casters to roll as easily as on a smooth, hard surface. It would therefore be desirable to provide a chair mat which has a smooth hard surface that is aesthetically pleasing and capable of blending in with the existing office furniture, and is resistant to the deterioration that adversely affects conventional vinyl chair mats.

SUMMARY OF THE INVENTION

The present invention provides very durable chair mats having a laminate construction comprising a substantially rigid plastic layer (preferably PVC) bonded on one side to a resin impregnated backing sheet and on the other side to a wood veneer layer—the top layer of the chair mat. In a preferred embodiment, the layers of the laminate chair mat are adhered to one another with pressure sensitive adhesive. The wood veneer (optionally stained with a conventional wood stain) is preferably sealed with a top coat of a water-based polyurethane to provide flexibility and to resist stress cracks. The chair mat of the present invention derives substantial strength and resistance to curling and warping from the unique combination of the PVC layer, the resin-impregnated backing sheet and the wood veneer layer. This laminate structure helps provide a substantially planar chair mat that is resistant to warping curling, cupping and cracking. The present invention combines the aesthetic appeal of a real wood veneer surface with durability that is desirable in a chair mat.

DETAILED DESCRIPTION OF THE PRESENT INVENTION

Figure 1:
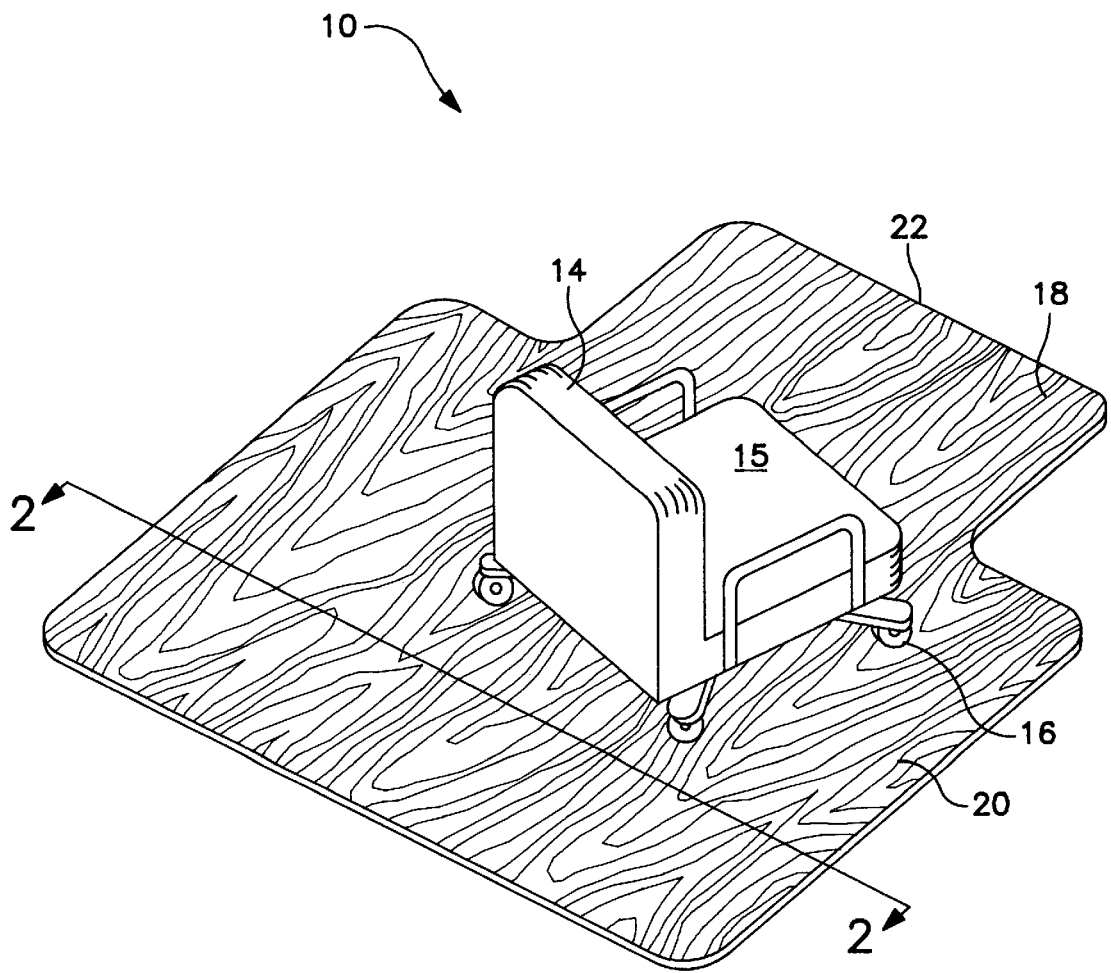
FIG. 1 is a plan view of a chair mat of the present invention.

Referring to FIG. 1, a chair mat 10 is shown positioned on a floor 12 beneath a chair 14 having roller casters 16. The chair mat 10 has a real wood veneer top side 18. The chair mat shown in FIG. 1 has a generally rectangular body 20 with an extending tongue portion 22. The chair mat may be provided in a variety of sizes, for example from 3 feet to 6 feet in length and/or width, optionally with a tongue portion sized to fit under a desk so as to accommodate the casters 16 of the chair when the seat 15 is positioned beneath the desk. The chair mat may be provided in a variety of shapes and sizes depending on the configuration of the work space in which it will be used. For example, one or more of the sides of the chair mat may be curved or otherwise shaped to fit into the work space.

Figure 2:
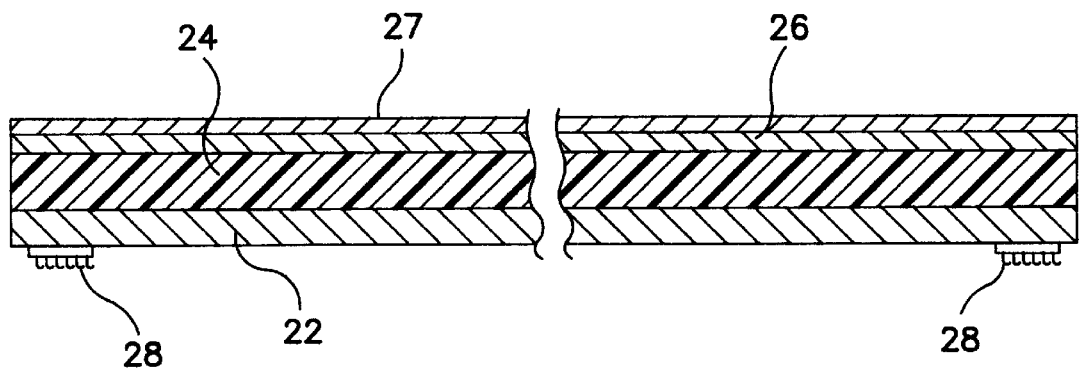
FIG. 2 is a cross section view of a chair mat of the present invention taken along line 2—2 of FIG. 1.

Referring to FIG. 2, the chair mat of the invention comprises three layers that are laminated together. A base layer 22 of the chair mat of the present invention preferably consists of a thin sheet of resin-impregnated paper, alternatively referred to in the art by the terms "backing sheet," "reground backer" and "balance sheet." A "backing sheet" is commonly provided as a phenolic impregnated kraft paper or like material. The backing sheet 22 will generally have a thickness of between about 0.5 mm and 1.3 mm (0.02–0.05 in.), preferably about 1.17 mm (0.046 in.). Suitable backing sheet material is commercially available from Formica Corporation of Cincinnati Ohio. A particularly preferred backing sheet material is Formica brand reground backer (Cat. No. 9304; thickness=0.046 in.) which consists of a melamine impregnated decorative surface paper consolidated under high pressure and high temperature with phenolic-treated kraft paper.

The backing sheet 22 is bonded to a substantially rigid plastic sheet material 24 (middle layer of the laminate) which in turn is bonded to a wood veneer layer 26. The plastic layer 24 of the chair mat of the present invention is preferably polyvinylchloride (PVC). The plastic sheet material 24 provides the chair mat of the invention with sufficient strength to resist denting of the wood veneer from compression under the weight of the user's chair during normal use. By the term "substantially rigid," it is meant that the plastic sheet material is substantially incompressible and may be capable of resiliently flexing or bending. The PVC sheet layer 24 preferably has a thickness of between about 1 mm and 5 mm, more preferably between about 1.5 mm and 4 mm. A presently preferred plastic material is PVC (type 1) sheet material is commercially available from Inteplast Corporation of Livingston, N.J. having a thickness of about 2.38 mm.

The wood veneer layer 26 may be provided, as known in the art, by a reconstructed or re-cut veneer that comprises a plurality of wood veneer strips adhered together in side-by-side relationship. The wood veneer may be of any known species of wood including, but not limited to, oak, teak, mahogany, cherry, maple or the like. The wood veneer layer 26 is bonded to the side of the PVC layer 24 opposite the side to which the reground backer 22 is bonded. A suitable thickness for the wood veneer layer is between about 0.5 and 1.0 mm, preferably about 0.64 mm (0.025 in.), although thicker or thinner wood veneers may be used if desired.

In the chair mat of the present invention, the backing sheet 22 and wood veneer 26 may be bonded to the PVC layer 24 using a variety of conventional adhesives, cements or other bonding agents. It is presently preferred to use a pressure sensitive adhesive, such as the product named Sta-Put, manufactured by Tacc International of Carpenterville, Ga.

The base layer 22 and the wood veneer layer 26 are each bonded to opposite sides of the PVC layer 24 in a single step by aligning the respective adhesive-coated surfaces and bringing them into contact with each other. As known in the art, the pressure sensitive adhesive should be allowed to set-up or cure to an appropriate degree of tackiness prior to bringing the adhesive-coating surfaces together. In a presently preferred method, the desired pressure to form the laminated chair mat of the invention is applied by a pinch roller device having a pair of hard rubber rollers that are spaced apart from each other by a distance that is slightly less than the thickness of the three layers of the laminate, although any suitable means of applying pressure to form a laminate may be used. As will be appreciated, the amount of pressure applied by the pinch rollers will be a function of the clearance between the rollers, as well as the length of time it takes for the laminated chair mat to be fed through the rollers. A proper clearance setting for the pinch rollers (i.e., slightly less than the thickness of the laminated work piece) is readily determined by a person having ordinary skill in the art. A presently preferred feed-rate is about 2 to 4 feet per minute.

After the bonding step is completed, the chair mat of the present invention may be cut to a predetermined shape using any suitable, conventional method such as routing, stamping, sheering, sawing or the like. The wood veneer laminated chair mat is preferably made to an initial size approximate to the final desired size and then cut to exact size and shape as desired. The edges of the laminate may then be finished by sanding and/or buffing to achieve a desired smoothness and degree of bevel.

It is presently preferred to apply a water-based polyurethane top coat 27 to the wood veneer surface (optionally after staining the wood veneer) to protect the wood and prevent cracking due to normal loads on the chair mat during use. Any conventional water-based polyurethane may be used for this purpose. A presently preferred water-based polyurethane top coat product is commercially available from Behr Corporation of Santa Anna, Calif.

The composition and thicknesses of the respective layers of the laminate are selected so that the wood veneer laminated chair mat is resistant to warping, cupping and curling. The PVC layer provides a majority of structural support to the laminated product. Typically, more than 50% (preferably about 60%–70%) of the total thickness of the chair mat of the invention will be provided by the intermediate PVC layer 24. PVC layer 24 should be of sufficient thickness to prevent denting or cracking of the wood veneer layer. However, it is important to the present invention that the laminated product have a backing sheet 22 that provides balance to the laminated chair mat due to the different degrees to which the PVC layer and wood veneer layer absorb moisture and thus expand and contract with environmental changes. The PVC sheet 24 is substantially impervious to moisture and therefore does not significantly expand or contract. Thus, the term "balance" refers to the ability to counteract certain forces exerted by the wood veneer layer's tendency to expand and contract relative to PVC layer 24. The backing sheet 22 which is adhered to the opposite surface of PVC layer 24 as the wood veneer layer 26 provides such "balance" to the laminated chair mat of the present invention. Consequently, normal temperature and humidity changes tending to cause the wood veneer layer 26 to expand or contract relative to the PVC layer 24 are off-set or balanced by the physical properties of the backing layer 22 which helps prevent undesirable warping, curling or cupping of the wood veneer laminated chair mat of the invention. This resistance to undesirable warping is particularly important where the overall thickness of the laminated chair mat of the invention is desirably kept to less than about 5 mm.

Figure 3:
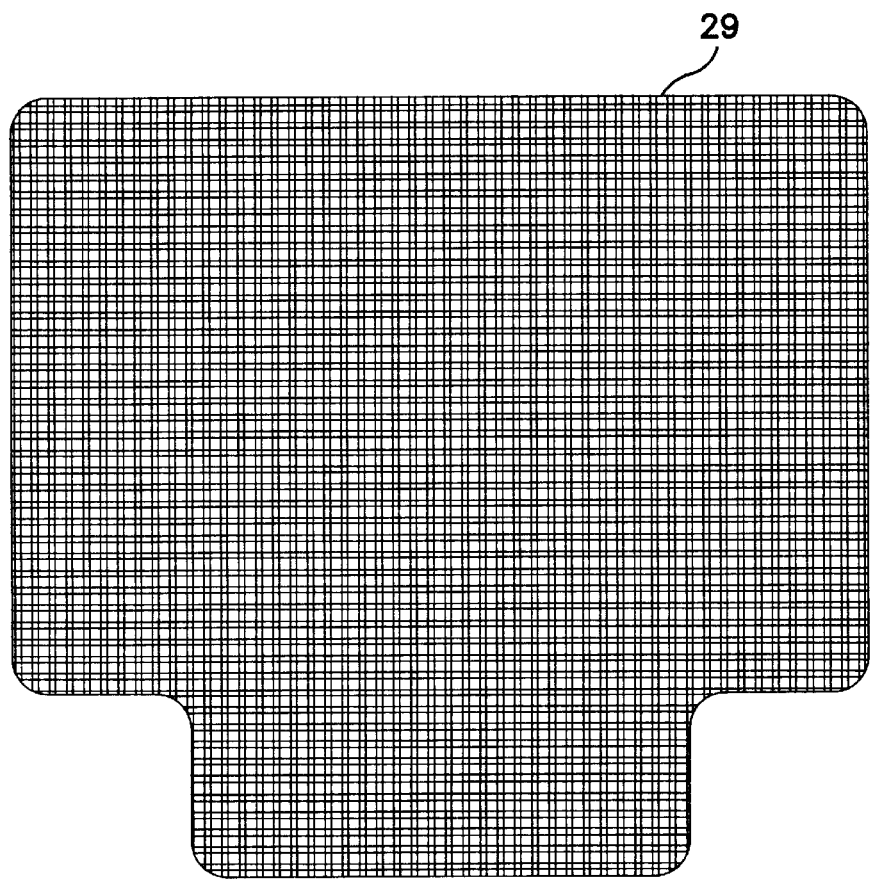
FIG. 3 is a bottom plan view of a chair mat of FIG. 1.

Floor gripping material may be bonded to the bottom surface of the fiberboard sheet (or a portion thereof) to increase friction and prevent undesirable movement of the chair mat during use. The optimum type of floor gripping material will depend upon the type of flooring with which the chair mat will be in contact. For example, a thin sheet of rubber, neoprene, cork or other suitable material may be bonded to the bottom surface of the chair mat to prevent sliding on smooth floors made of linoleum, wood, ceramic tile, marble and the like. With reference to FIG. 3, one type of gripping material that may be adhered to the underside of the chair is a rubber mesh material 29 that is commonly used to prevent area rugs from sliding on wood floors, such as the non-slip rug underlay Natura-lock sold by MSM Industries, Smyrna, Tenn. Alternatively, strips 28 (see FIG. 2) of the loop portion of a hook-and-loop fastener material, commercially available from Outwater Plastic Industries, Inc., Wood-Ridge, N.J. 07175, can be adhered to the bottom of the chair mat as floor gripping material to resist sliding on carpeted flooring.

Applicant's foregoing description of the present invention is illustrative. Other modifications and variations will be apparent to those of ordinary skill in the art in light of the specification, and such modifications and variations are within the scope of the invention defined by the following claims.

What is claimed is:

1. A wood veneer laminated chair mat for covering a predetermined area of a floor, the chair mat comprising a substantially rigid sheet of plastic, a resin impregnated backing sheet, and a sheet of wood veneer, wherein the plastic sheet is between the backing sheet and the wood veneer sheet, and wherein a floor gripping material is adhered to at least a portion of the backing sheet of the chair mat.

2. A wood veneer laminated chair mat according to claim 1, wherein the resin impregnated backing sheet comprises phenolic impregnated kraft paper.

3. A wood veneer laminated chair mat according to claim 1, wherein the plastic sheet material is polyvinylchloride.

4. A wood veneer laminated chair mat according to claim 3, wherein the polyvinylchloride sheet material has a thickness of between about 2 to about 3 millimeters.

5. A wood veneer laminated chair mat according to claim 1, wherein the resin impregnated backing sheet has a thickness of between about 1.0 and 1.3 millimeters.

6. A wood veneer laminated chair mat according to claim 1, wherein the wood veneer layer has a thickness of between about 0.5 and 0.75 millimeters.

7. A wood veneer laminated chair mat according to claim 1, having pressure sensitive adhesive between a first side of the plastic sheet and the resin impregnated backing sheet and between a second side of the plastic sheet and the wood veneer.

8. A wood veneer laminated chair mat according to claim 1 wherein the floor-gripping material is selected from the group consisting of rubber, neoprene, cork and a looped member of a hook-and-loop fastener combination.

9. A wood veneer laminated chair mat according to claim 1, wherein the laminated chair mat has a thickness of 2.25 to 5 millimeters.

* * * * *